(12) United States Patent
Cho (10) Patent No.: US 8,726,864 B2
(45) Date of Patent: May 20, 2014

(54) ENGINE THAT ACTIVELY VARIES COMPRESSION EXPANSION RATIO

(75) Inventor: Jin Hee Cho, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 67 days.

(21) Appl. No.: 13/488,975

(22) Filed: Jun. 5, 2012

(65) Prior Publication Data

US 2013/0152888 A1 Jun. 20, 2013

(30) Foreign Application Priority Data

Dec. 14, 2011 (KR) .................. 10-2011-0134868

(51) Int. Cl.
*F01L 1/34* (2006.01)

(52) U.S. Cl.
USPC .............. 123/90.16; 123/90.15; 123/90.17; 123/90.6

(58) Field of Classification Search
USPC .............. 123/90.15, 90.16, 90.17, 90.6
See application file for complete search history.

(56) References Cited

U.S. PATENT DOCUMENTS

| 7,448,359 B2 * | 11/2008 | Jankovic ................. 123/432 |
| 7,647,159 B2 | 1/2010 | Fuwa |
| 7,690,339 B2 * | 4/2010 | Fuwa et al. ............. 123/90.16 |

FOREIGN PATENT DOCUMENTS

| JP | 2006-299915 A | 11/2006 |
| JP | 2006-300005 A | 11/2006 |
| JP | 2010-151147 A | 7/2010 |
| JP | 4579323 B2 | 9/2010 |

* cited by examiner

*Primary Examiner* — Ching Chang
(74) *Attorney, Agent, or Firm* — Morgan, Lewis & Bockius LLP (57) ABSTRACT

An engine that actively varies a compress expansion ratio may include an intake camshaft to which an intake cam may be formed to lift an intake valve, an exhaust camshaft to which an exhaust cam may be formed to lift an exhaust valve, an intake valve variable timing unit disposed at one end portion of the intake camshaft to advance or retard a rotation of the intake camshaft, an exhaust valve variable timing unit disposed at one end portion of the exhaust camshaft to advance or retard a rotation of the exhaust camshaft, an intake valve variable duration unit disposed at the other end portion of the intake camshaft to vary a lift duration of the intake camshaft, and an exhaust valve variable duration unit disposed at the other end portion of the exhaust camshaft to vary a lift duration of the exhaust camshaft.

6 Claims, 9 Drawing Sheets

| valve | CVVT | CVVT( Outer & Inner equal phase:VVD 0 ) | | |
|---|---|---|---|---|
| | | Timing | Duration | VVD angle |
| intake valve | 50° | BTDC 42° ~ BBDC 2° | 220 | 0°    max advance angle |
| | 0° | ATDC 8° ~ ABDC 48° | |    max retard angle (early stage) |
| exhaust valve | 0° | BBDC 20° ~ BTDC 16° | 184 | 0°    max advanvce angle (early stage) |
| | -40° | ABDC 20° ~ ATDC 24° | |    max retard angle |

| valve | operation | CVVT+VVD (max phase change) | | |
|---|---|---|---|---|
| | | Timing | Duration | VVD angle |
| intake valve | 50° | BTDC 42° ~ BBDC 68° | 290 | 70°    max advance angle |
| | 0° | ATDC 8° ~ ABDC 118° | |    max retard angle (early stage) |
| exhaust valve | 0° | BBDC 90° ~ BTDC 16° | 254 | 70°    max advanvce angle (early stage) |
| | -40° | ABDC 50° ~ ATDC 24° | |    max retard angle |

ENGINE THAT ACTIVELY VARIES COMPRESSION EXPANSION RATIO

CROSS-REFERENCE TO RELATED APPLICATION

The present application claims priority to Korean Patent Application No. 10-2011-0134868 filed in the Korean Intellectual Property Office on Dec. 14, 2011, the entire contents of which is incorporated herein for all purposes by this reference.

BACKGROUND OF THE INVENTION

1. Field of the Invention

The present invention relates to an engine that actively varies a compress expansion ratio, which has a variable valve duration unit that improves an air charging efficiency, reduces a pumping loss, improves an expansion efficiency, and that varies a real compression ratio.

2. Description of Related Art

A typical internal combustion engine that is used for a vehicle includes a variable valve timing unit that varies a lift timing of an intake valve and an exhaust valve according to an engine driving condition to improve engine output and exhaust characteristic.

Meanwhile, researches for improving air charging efficiency, reducing a pumping loss, improving expansion efficiency, and varying a real compression ratio have been continuously undertaken.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an engine that actively varies a compression expansion ratio having advantages of having a variable valve duration unit that improves charging efficiency, reduces pumping loss, improves expansion efficiency, and varies real compression ratio.

In an aspect of the present invention, an engine that actively varies a compress expansion ratio, may include an intake camshaft to which an intake cam is formed to lift an intake valve, an exhaust camshaft to which an exhaust cam is formed to lift an exhaust valve, an intake valve variable timing unit that is disposed at one end portion of the intake camshaft to advance or retard a rotation of the intake camshaft, an exhaust valve variable timing unit that is disposed at one end portion of the exhaust camshaft to advance or retard a rotation of the exhaust camshaft, an intake valve variable duration unit that is disposed at the other end portion of the intake camshaft to vary a lift duration of the intake camshaft, and an exhaust valve variable duration unit that is disposed at the other end portion of the exhaust camshaft to vary a lift duration of the exhaust camshaft.

An air flow sensor is mounted to an intake line to detect air flow amount that is supplied from the intake line to a combustion chamber of a cylinder through the intake valve.

The intake camshaft may include an intake outer pipe to which the intake valve variable timing unit is engaged, wherein a rotation position of the intake outer pipe is advanced or retarded by the intake valve variable timing unit and wherein an intake outer cam is formed on an exterior circumference of the intake outer pipe, and an intake inner pipe to which the intake valve variable duration unit is engaged, wherein a rotation position of the intake inner pipe is advanced or retarded by the intake valve variable duration unit and wherein an intake inner cam is formed on an exterior circumference of the intake inner pipe, wherein the intake inner pipe is slidably inserted into the intake outer pipe.

The engine may further may include an outer cam fixation pin that fixes the intake outer cam on the exterior circumference of the intake outer pipe, wherein a slot is formed in the intake outer pipe along a circumferential direction thereof, and an inner cam fixation pin that fixes the intake inner cam slidably mounted on the intake outer cam, to the intake inner pipe through the slot.

The intake valve may include a first intake valve and a second intake valve that supplies a combustion chamber with air, wherein the first intake valve is lifted by the intake outer cam and a lift timing thereof is continuously varied and the second intake valve is lifted by the intake inner cam and a lift duration thereof is continuously varied.

A first exterior diameter of a first mounting portion to which the intake valve variable timing unit is mounted at one end portion of the intake outer pipe and a second exterior diameter of a second mounting portion to which the intake valve variable duration unit is mounted at one end portion of the intake inner pipe may have an equal diameter length.

The shape of the first mounting portion that the intake valve variable timing unit is mounted at the one end portion of the intake outer pipe and the shape of the second mounting portion that the intake valve variable duration unit is mounted at the one end portion of the intake inner pipe are formed symmetrically from each other.

The continuously variable valve timing unit and the variable valve duration unit are simultaneously applied to the intake camshaft and the exhaust camshaft according to an exemplary embodiment of the present invention and therefore the charging efficiency is improved, the pumping loss is reduced, the expansion efficiency is improved, the real compression ratio is easily varied, and the compression/expansion ratio is actively varied.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

Figure 1:
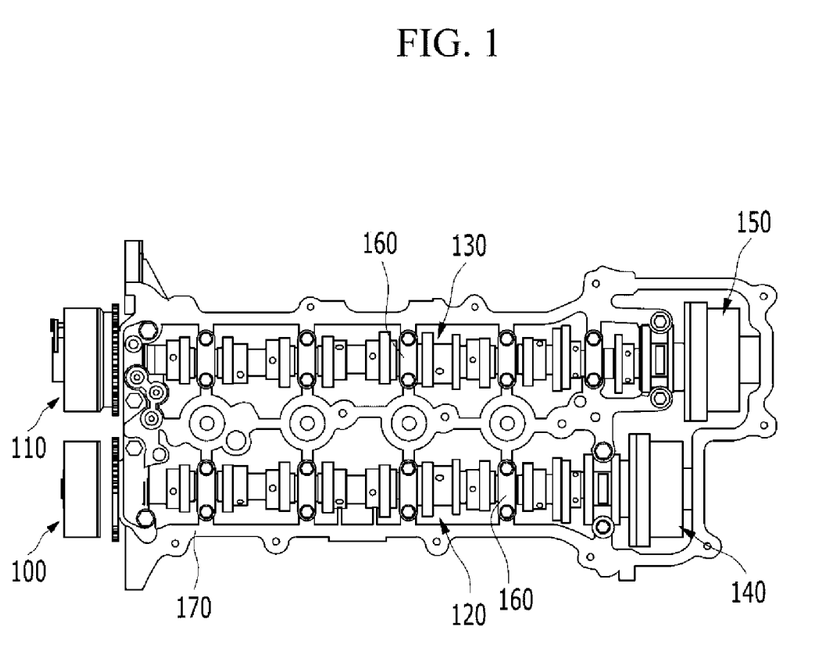
FIG. 1 is a schematic partial top plan view of an engine that actively varies compression expansion ratio according to an exemplary embodiment of the present invention.

FIG. 1 is a schematic partial top plan view of an engine that actively varies compression expansion ratio according to an exemplary embodiment of the present invention.

Referring to FIG. 1, an engine includes a cylinder head 170, an intake camshaft 120, an exhaust camshaft 130, a cam cap 160, an intake valve variable timing unit 100, an exhaust valve variable timing unit 110, an intake valve variable duration unit 140, and an exhaust valve variable duration unit 150.

The intake camshaft 120 and the exhaust camshaft 130 are disposed in parallel on the cylinder head 170, the intake valve variable timing unit 100 is disposed at one end portion of the intake camshaft 120, and the exhaust valve variable timing unit 110 is disposed at one end portion of the exhaust camshaft 130.

The intake valve variable duration unit 140 is disposed at the other end portion of the intake camshaft 120 and the exhaust valve variable duration unit 150 is disposed at the other end portion of the exhaust camshaft 130.

The intake valve variable timing unit 100 advances or retards the rotation position of the intake camshaft 120 to advances or retards the opening timing of the intake valve. Further, the exhaust valve variable timing unit 110 advances or retards the rotation position of the exhaust camshaft 130 to advances or retards the opening timing of the exhaust valve.

The intake valve variable duration unit 140 reduces or increases the opening duration time of the intake valve. Further, the exhaust valve variable duration unit 150 reduces or increases the opening duration time of the exhaust valve.

The intake valve variable timing unit 100 controls an opening timing of the first intake valve of a cylinder and the intake valve variable duration unit 140 controls a closing timing of the second intake valve of the cylinder such that the opening timing and the closing timing of the valve in an exemplary embodiment of the present invention.

Figure 2:
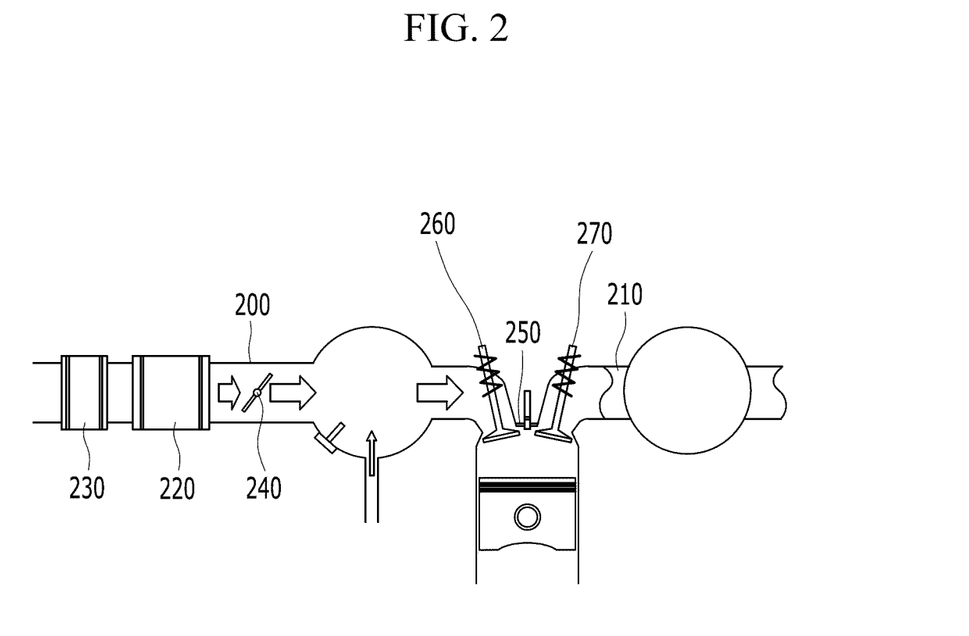
FIG. 2 is a schematic diagram of an engine that actively varies compression expansion ratio according to an exemplary embodiment of the present invention.

FIG. 2 is a schematic diagram of an engine that actively varies compression expansion ratio according to an exemplary embodiment of the present invention.

Referring to FIG. 2, an engine includes an intake line 200, a combustion chamber 250, an exhaust line 210, an air cleaner 230, an air flow sensor 220, a throttle valve 240, an intake valve 260, and an exhaust valve 270.

Further, the intake valve 260 includes a first and a second intake valves and the exhaust valve 270 includes a first and a second exhaust valves.

The opening timing and the opening duration time of the intake valve 260 and the exhaust valve 270 are variably changed according to a driving condition of an engine, and therefore it is not easy to apply modeling value to an intake air amount that flows through the intake line 200.

Accordingly, the air flow sensor 220 is disposed between the throttle valve 240 and the air cleaner 230 on the intake line 200. The air flow sensor 220 detects mass flow amount of an intake air that is supplied from the combustion chamber 250 through the intake line 200.

Figure 3:
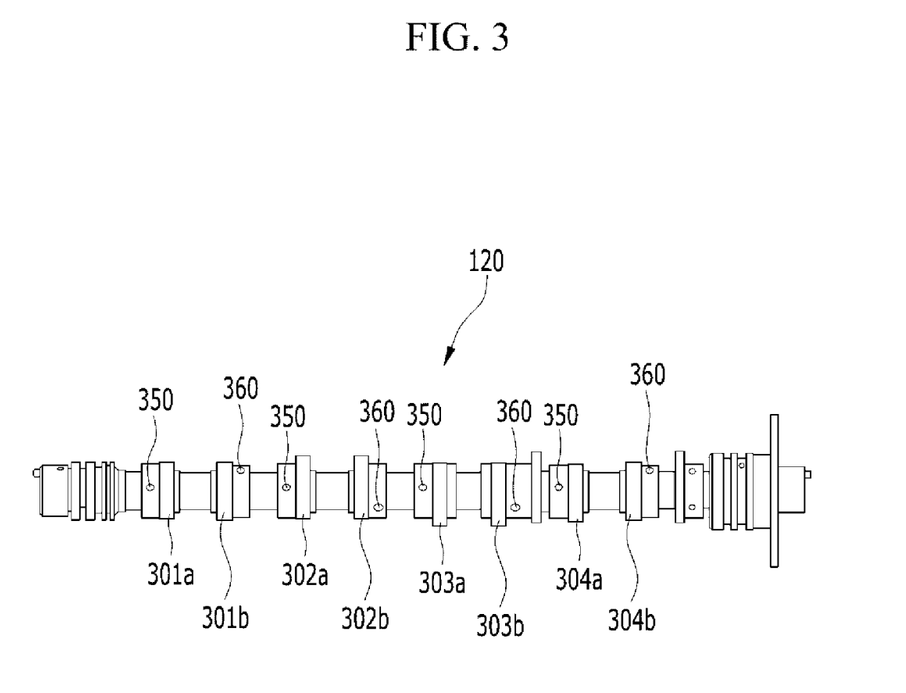
FIG. 3 is a top plan view of an intake camshaft of an engine that actively varies compression expansion ratio according to an exemplary embodiment of the present invention.

FIG. 3 is a top plan view of an intake camshaft of an engine that actively varies compression expansion ratio according to an exemplary embodiment of the present invention.

Referring to FIG. 3, a first intake outer cam 301a, a first intake inner cam 301b, a second intake outer cam 302a, a second intake inner cam 302b, a third intake outer cam 303a, a third intake inner cam 303b, a fourth intake outer cam 304a, and a fourth intake inner cam 304b are sequentially formed on the intake camshaft 120, and these are fixed by a first fixing pin 350 and a second a fixing pin 360.

The rotation amount of the first intake outer cam 301a, the second intake outer cam 302a, the third intake outer cam 303a, and the fourth intake outer cam 304a is controlled by the intake valve variable timing unit 100 and the rotation amount of the first intake inner cam 301b, the second intake inner cam 302b, the third intake inner cam 303b, and the fourth intake inner cam 304b is controlled by the intake valve variable duration unit 140.

Figure 4:
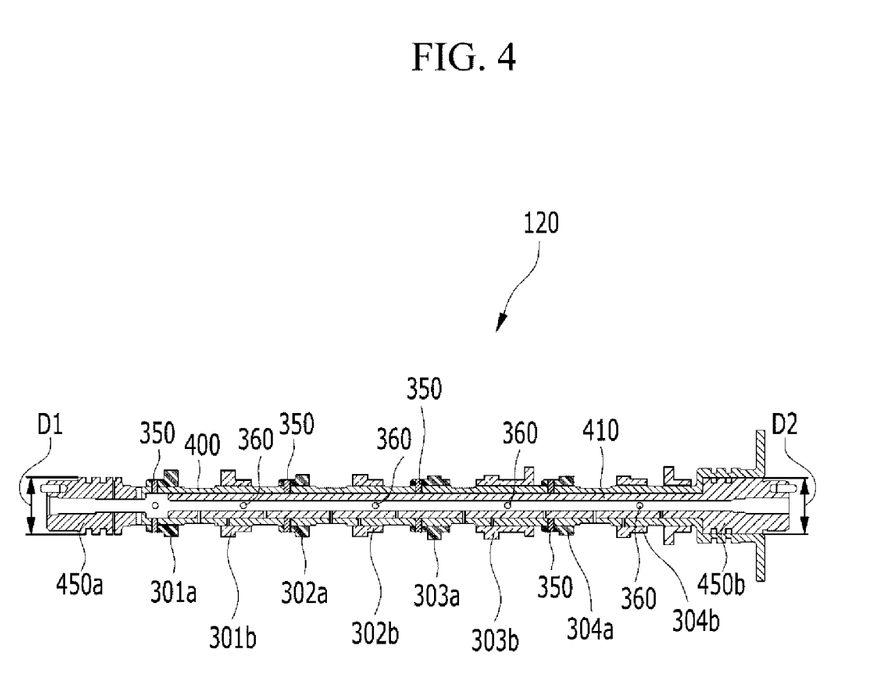
FIG. 4 is a cross-sectional view of an intake camshaft of an engine that actively varies compress expansion ratio according to an exemplary embodiment of the present invention.

FIG. 4 is a cross-sectional view of an intake camshaft of an engine that actively varies compress expansion ratio according to an exemplary embodiment of the present invention.

Referring to FIG. 4, the intake camshaft 120 includes an intake outer pipe 400 that a first mounting portion 450a that the intake valve variable timing unit 100 is mounted is formed at one end portion thereof and an intake inner pipe 410 that the second mounting portion 450b is mounted is formed at the other end portion thereof.

One end portion of the intake inner pipe 410 is inserted into the other end portion hole of the intake outer pipe 400 in the intake camshaft 120.

The first intake outer cam 301a, the second intake outer cam 302a, the third intake outer cam 303a, and the fourth intake outer cam 304a are fixed on the intake outer pipe 400 by the first a fixing pin 350, and the first intake inner cam 301b, the second intake inner cam 302b, the third intake inner cam 303b, and the fourth intake inner cam 304b are fixed on the intake inner pipe 410 by the second a fixing pin 360.

The first exterior diameter D1 of the first mounting portion 450a that the intake valve variable timing unit 100 is mounted at one end portion of the intake outer pipe 400 has an equal length of the second exterior diameter D2 of the second mounting portion 450b that the intake valve variable duration unit 140 is mounted at the other end portion of the intake inner pipe 410 in an exemplary embodiment of the present invention. Accordingly, the component can be commonly used and the manufacturing process can be simple.

The shape of the first mounting portion 450a that the intake valve variable timing unit 100 is mounted at one end portion of the intake outer pipe 400 is symmetrical to the shape of the second mounting portion 450b that the intake valve variable duration unit 140 is mounted at the other end portion of the intake inner pipe 410.

Figure 5:
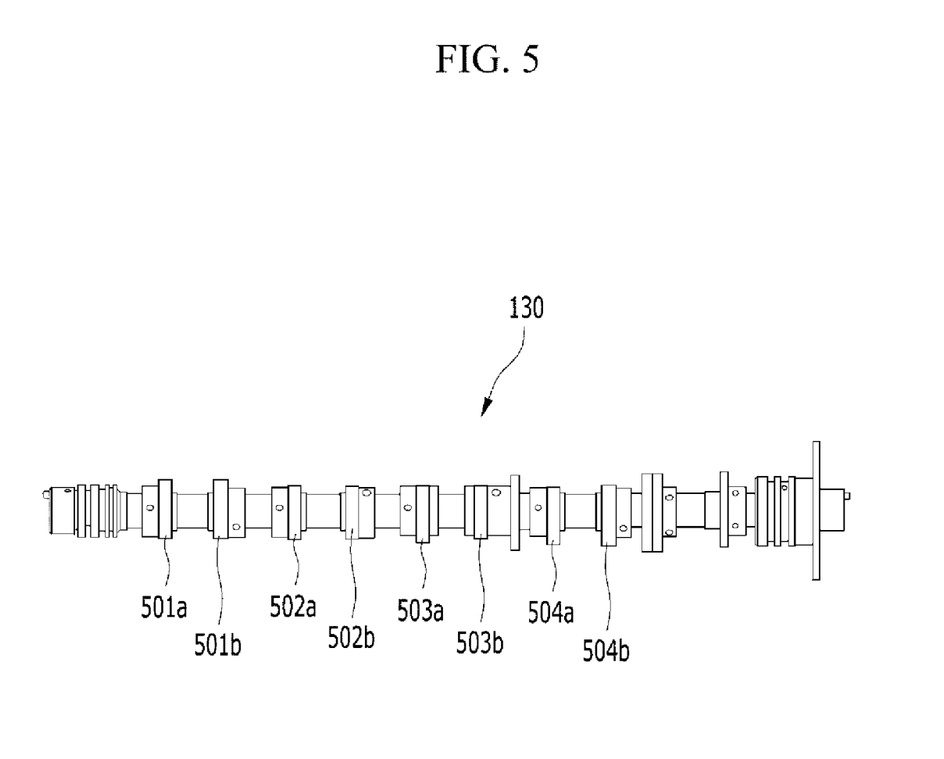
FIG. 5 is a top plan view of an exhaust camshaft of an engine that actively varies compress expansion ratio according to an exemplary embodiment of the present invention.

FIG. 5 is a top plan view of an exhaust camshaft of an engine that actively varies compress expansion ratio according to an exemplary embodiment of the present invention.

Referring to FIG. 5, the exhaust camshaft 130 includes a first exhaust outer cam 501a, a first exhaust inner cam 501b, a second exhaust outer cam 502a, a second exhaust inner cam 502h, a third exhaust outer cam 503a, a third exhaust inner cam 503b, a fourth exhaust outer cam 504a, and a fourth exhaust inner cam 504b that are sequentially formed, and these are fixed by a first fixing pin 350 and a second fixing pin 360.

The rotation of the first exhaust outer cam 501a, the second exhaust outer cam 502a, the third exhaust outer cam 503a, and the fourth exhaust outer cam 504a are controlled by the exhaust valve variable timing unit 110 and the rotation of the first exhaust inner cam 501b, the second exhaust inner cam 502b, the third exhaust inner cam 503b, and the fourth exhaust inner cam 504b are controlled by the exhaust valve variable duration unit 150.

The structure of the exhaust camshaft 130 is different from that of the intake camshaft 120 that is shown in FIG. 3, but the structure thereof is similar to a person of an ordinary skill in the art, and therefore the detailed description thereof will be omitted.

Firstly, a partial sectional structure of the intake camshaft 120 will be detailed.

Figure 7:
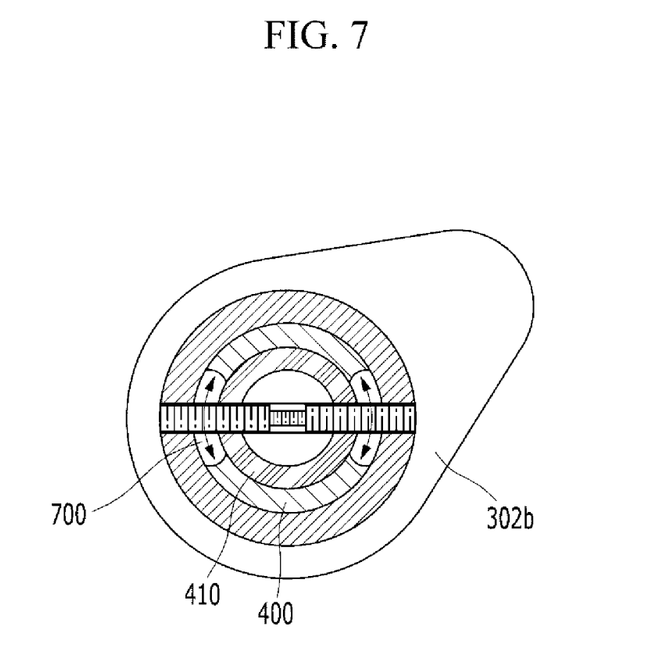
FIG. 7 is a cross-sectional view of an intake camshaft along line VII-VII of FIG. 4.

FIG. 7 is a cross-sectional view of an intake camshaft along line VII-VII of FIG. 4.

Referring to FIG. 7, the intake inner pipe 410 is inserted into the intake outer pipe 400, wherein the intake inner pipe 410 is rotatably disposed in the intake outer pipe 400.

Further, the second intake inner cam 302b is fixed on the intake inner pipe 410 by the second a fixing pin 360. More particularly, the second fixing pin 360 traverses a central portion of the intake camshaft 120 to be inserted thereinto.

Accordingly, the second fixing pin 360 is disposed to penetrate the second intake inner cam 302b, the intake outer pipe 400, and the intake inner pipe 410.

Here, a slot 700 is formed in the intake outer pipe 400 such that the second fixing pin 360 can move in a rotating direction thereof.

Accordingly, while the intake inner pipe 410 and the second intake inner cam 302b rotate together, the intake outer pipe 400 relatively is not be rotated by the slot 700.

Figure 6:
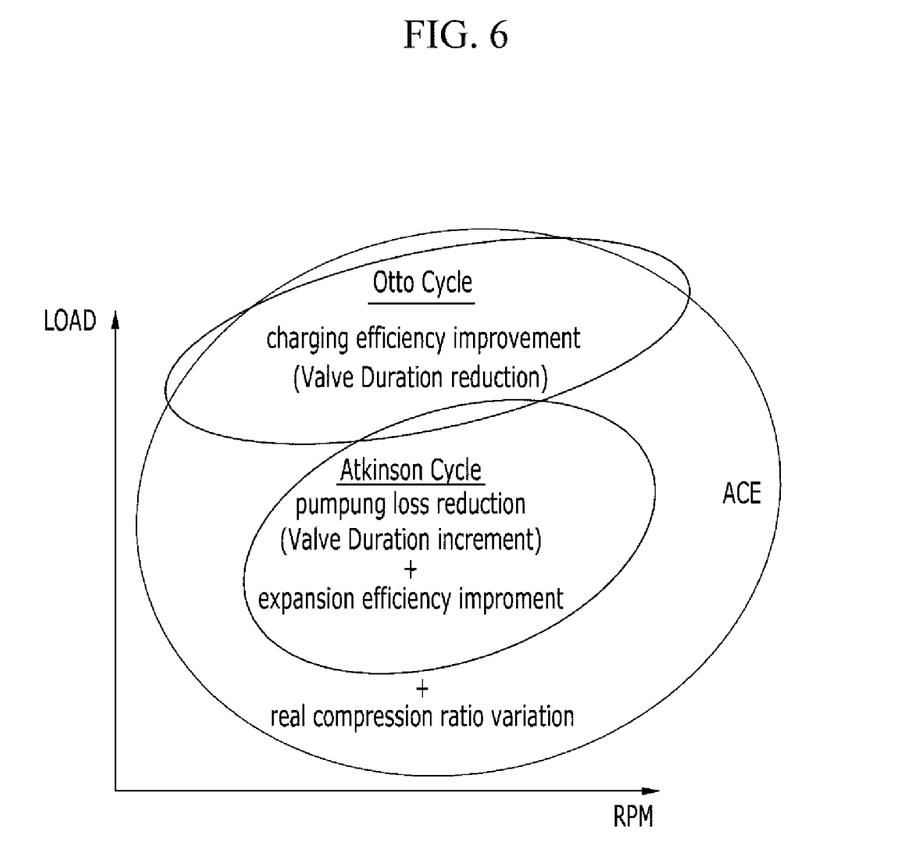
FIG. 6 is a graph showing an effect of an engine that actively varies compress expansion ratio according to an exemplary embodiment of the present invention.

FIG. 6 is a graph showing an effect of an engine that actively varies compress expansion ratio according to an exemplary embodiment of the present invention.

Referring to FIG. 6, a horizontal axis denotes a rotation speed (RPM) of an engine and a vertical axis denotes a load of the engine.

An ACE (Active compression expansion ration) engine according to an exemplary embodiment of the present invention controls real compression ratio and real expansion ratio according to a load area of the engine to realize a compound cycle stroke.

That is, the opening timing of the intake valve 260 and the exhaust valve 270 is controlled through the intake valve variable timing unit 100 and the exhaust valve variable timing unit 110 and the opening duration time of the intake valve 260 and the exhaust valve 270 is controlled through the intake valve variable duration unit 140 and the exhaust valve variable duration unit 150.

Accordingly, the real compression ratio and expansion ratio are actively controlled.

Referring to FIG. 6, the air charging efficiency is improved by reducing an opening duration time of a valve to realize an otto cycle, and the pumping loss is reduced and the expansion efficiency is improved by increasing an opening duration time of a valve to realize Atkinson cycle. Further, a real compress ratio can be varied.

Intake air is supplied into one combustion chamber through a first intake valve and a second intake valve in an exemplary embodiment of the present invention, wherein the opening timing of the first intake valve is varied by the intake outer cam and the closing timing of the second intake valve is varied by the intake inner cam such that the opening duration time is varied.

That is, the opening timing and the closing timing of the first intake valve and the second intake valve are respectively controlled to be able to control the opening duration time of overall intake valve, a swirl is formed in the combustion chamber through the first and second intake valve that are respectively controlled to improve combustion efficiency and output.

Figure 8:
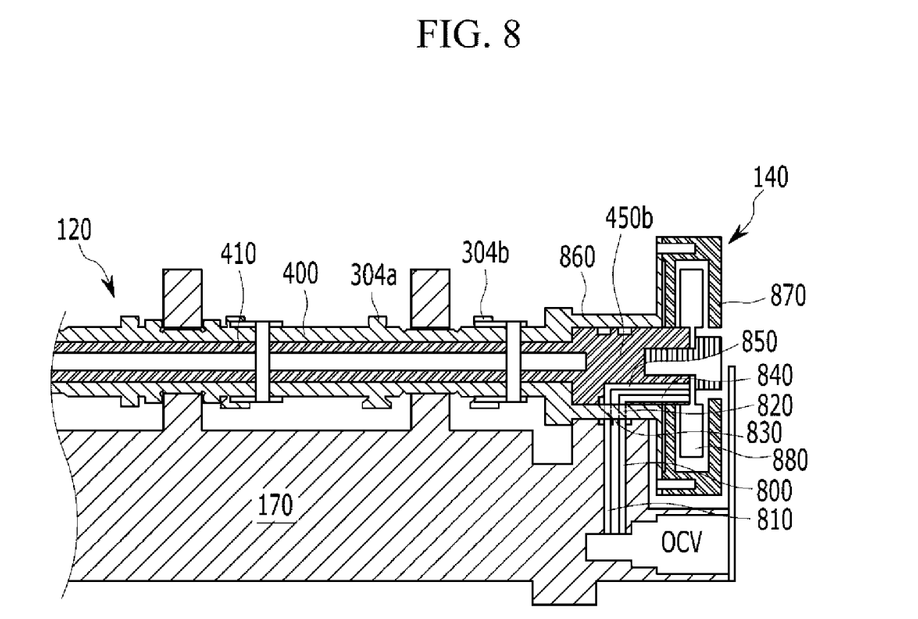
FIG. 8 is a schematic partial cross-sectional view of according to an exemplary embodiment of the present invention.

FIG. 8 is a schematic partial cross-sectional view of according to an exemplary embodiment of the present invention.

Referring to FIG. 8, a fourth intake outer cam 304a and a fourth intake inner cam 304b are disposed on the intake camshaft 120, the fourth intake outer cam 304a is operated by the intake outer camshaft 400, and the fourth intake inner cam 304b is operated by the intake inner camshaft 410.

As shown, the intake inner camshaft 410 is inserted into the intake outer camshaft 400.

A second mounting portion 450b that the intake valve variable duration unit 140 is disposed is formed at a left side end portion of the intake inner camshaft 410 and a journal portion 860 is formed along the second mounting portion 450b. The second mounting portion 450b rotates within the journal portion 860.

The journal portion 860 can be integrally formed with the intake outer camshaft 400. Further, hydraulic pressure passages are formed in the cylinder head 170, the journal portion 860, and the second mounting portion 450b to supply hydraulic pressure to a variable valve 880 of the intake valve variable duration unit 140.

The variable valve 880 is disposed in a housing 870 and uses hydraulic pressure to advance or retard the rotation of the intake inner camshaft 410.

The hydraulic pressure passages include a first passage 800, a second passage 810, a third passage 820, a fourth passage 830, a fifth passage 840, and a sixth passage 850. The first and second passages 800 and 810 are formed in the cylinder head 170, the third and fourth passages 820 and 830 are formed in the journal portion 860 corresponding to the first and second passages 800 and 810, and the fifth and sixth passages 840 and 850 are formed in the second mounting portion 450b corresponding to the third and fourth passages 820 and 830.

A hydraulic pressure is supplied through the first passage 800, the third passage 820, and the fifth passage 840 for advancing or retarding the rotation of the variable valve 880, and a hydraulic pressure is supplied through the second passage 810, the fourth passage 830, and the sixth passage 850 for advancing or retarding the rotation of the variable valve 880.

While the retarding hydraulic pressure is being supplied, the advancing hydraulic pressure is not supplied, and while the advancing hydraulic pressure is supplied, the retarding hydraulic pressure is not supplied. The retarding hydraulic pressure or the advancing hydraulic pressure is controlled by an oil control valve (OCV).

Figure 9:
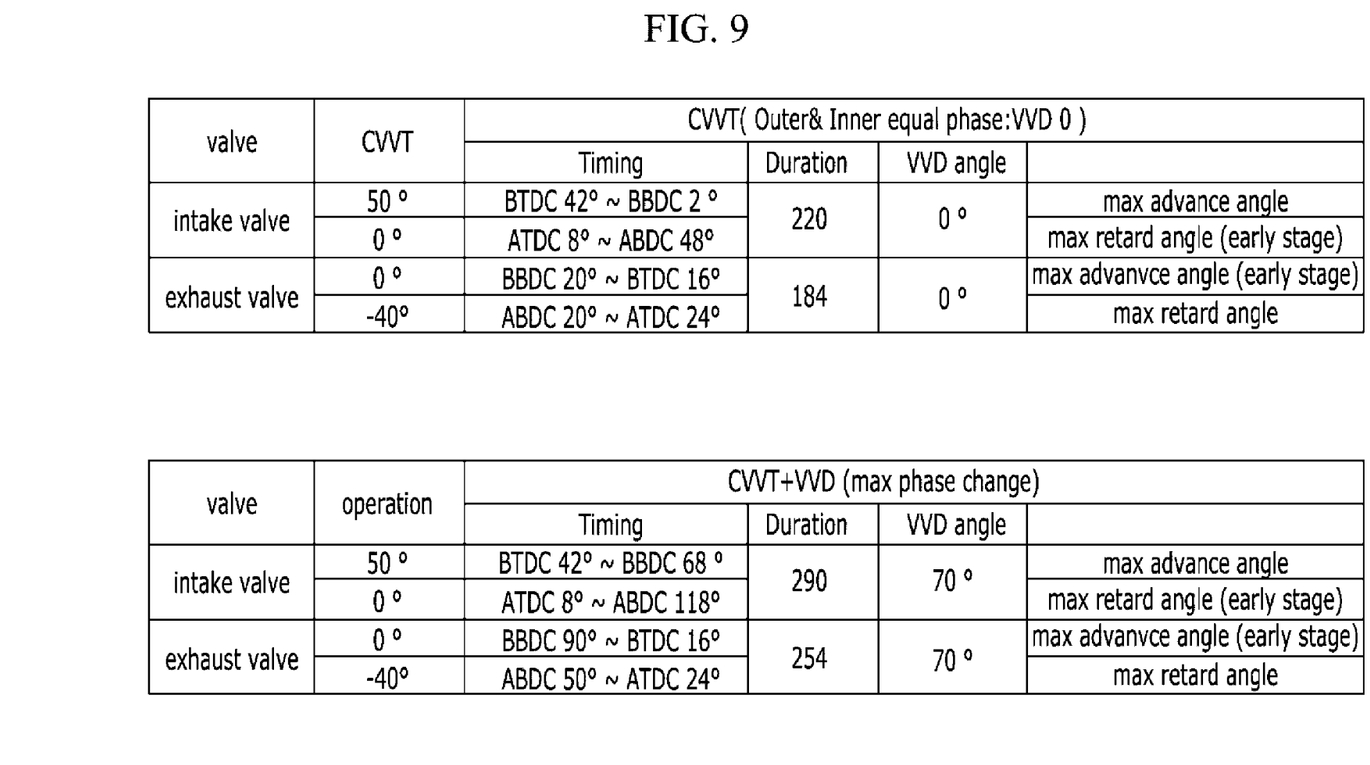
FIG. 9 is a table showing an effect of an engine according to an exemplary embodiment of the present invention.

FIG. 9 is a table showing an effect of an engine according to an exemplary embodiment of the present invention.

Referring to FIG. 9, when a rotation phase of an inner cam and an outer cam of the intake inner camshaft 410 and the intake outer camshaft 400 is equal, the opening duration time of the intake valve is 220 and the opening duration time of the exhaust valve is 184.

Further, when the intake valve variable duration unit 140 is operated at full, the opening duration time of the intake valve is increased to 290 and the opening duration time of the exhaust valve is increased to 254.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An engine that actively varies a compress expansion ratio, comprising:
   an intake camshaft to which an intake cam is formed to lift an intake valve;
   an exhaust camshaft to which an exhaust cam is formed to lift an exhaust valve;
   an intake valve variable timing unit that is disposed at one end portion of the intake camshaft to advance or retard a rotation of the intake camshaft;
   an exhaust valve variable timing unit that is disposed at one end portion of the exhaust camshaft to advance or retard a rotation of the exhaust camshaft;
   an intake valve variable duration unit that is disposed at the other end portion of the intake camshaft to vary a lift duration of the intake camshaft; and
   an exhaust valve variable duration unit that is disposed at the other end portion of the exhaust camshaft to vary a lift duration of the exhaust camshaft;
   wherein the intake camshaft includes an intake outer pipe to which the intake valve variable timing unit is engaged, wherein a rotation position of the intake outer pipe is advanced or retarded by the intake valve variable timing unit and wherein an intake outer cam is formed on an exterior circumference of the intake outer pipe, and an intake inner pipe to which the intake valve variable duration unit is engaged, wherein a rotation position of the intake inner pipe is advanced or retarded by the intake valve variable duration unit and wherein an intake inner cam is formed on an exterior circumference of the intake inner pipe; and
   wherein the intake inner pipe is slidably inserted into the intake outer pipe.

2. The engine of claim 1, wherein an air flow sensor is mounted to an intake line to detect air flow amount that is supplied from the intake line to a combustion chamber of a cylinder through the intake valve.

3. The engine of claim 1, further comprising;
   an outer cam fixation pin that fixes the intake outer cam on the exterior circumference of the intake outer pipe, wherein a slot is formed in the intake outer pipe along a circumferential direction thereof, and
   an inner cam fixation pin that fixes the intake inner cam slidably mounted on the intake outer cam, to the intake inner pipe through the slot.

4. The engine of claim 1, wherein the intake valve includes a first intake valve and a second intake valve that supplies a combustion chamber with air, wherein the first intake valve is lifted by the intake outer cam and a lift timing thereof is continuously varied and the second intake valve is lifted by the intake inner cam and a lift duration thereof is continuously varied.

5. The engine of claim 4, wherein a first exterior diameter of a first mounting portion to which the intake valve variable timing unit is mounted at one end portion of the intake outer pipe and a second exterior diameter of a second mounting portion to which the intake valve variable duration unit is mounted at one end portion of the intake inner pipe have an equal diameter length.

6. The engine of claim 5, wherein the shape of the first mounting portion that the intake valve variable timing unit is mounted at the one end portion of the intake outer pipe and the shape of the second mounting portion that the intake valve variable duration unit is mounted at the one end portion of the intake inner pipe are formed symmetrically from each other.

* * * * *